United States Patent [19]

Ishii

[11] Patent Number: 5,678,206
[45] Date of Patent: Oct. 14, 1997

[54] KEYPAD COVER HINGE

[75] Inventor: Takeshi Ishii, Osaka-Sayama, Japan

[73] Assignee: E. F. Johnson Company, Burnsville, Minn.

[21] Appl. No.: 422,490

[22] Filed: Apr. 12, 1995

[51] Int. Cl.$^6$ ........................................ H04B 1/38
[52] U.S. Cl. .................... 455/90; 455/89; 455/348; 455/351; 16/342
[58] Field of Search ................... 455/89, 90, 128, 455/351, 348, 349; 379/433, 434, 428; 16/341, 342, 229, 254, 380; D14/138, 250; 224/164; 63/3, 7, 8

[56] References Cited

U.S. PATENT DOCUMENTS

| | | |
|---|---|---|
| D. 282,738 | 2/1986 | Nichols . |
| D. 298,036 | 10/1988 | Watanabe . |
| D. 300,742 | 4/1989 | Soren et al. . |
| D. 300,827 | 4/1989 | Soren et al. . |
| D. 305,427 | 1/1990 | Soren et al. . |
| D. 306,294 | 2/1990 | Watanabe . |
| D. 315,731 | 3/1991 | Watanabe . |
| D. 317,606 | 6/1991 | Irie et al. . |
| D. 318,050 | 7/1991 | Elbaz et al. . |
| D. 319,233 | 8/1991 | Konno et al. . |
| D. 325,028 | 3/1992 | Nagele et al. . |
| D. 325,029 | 3/1992 | Nagele et al. . |
| D. 334,568 | 4/1993 | Giordano, Jr. et al. . |
| D. 337,763 | 7/1993 | Seki et al. . |
| D. 338,199 | 8/1993 | Andrew . |
| D. 339,127 | 9/1993 | Taylor . |
| D. 340,451 | 10/1993 | Beaumont et al. . |
| D. 340,711 | 10/1993 | Nagele et al. . |
| D. 342,248 | 12/1993 | Nagele et al. . |
| D. 343,834 | 2/1994 | Taylor . |
| D. 348,071 | 6/1994 | Siddoway et al. . |
| 3,924,293 | 12/1975 | Cain ............................ 16/229 |
| 4,073,038 | 2/1978 | Curry et al. ................... 16/301 |
| 4,648,125 | 3/1987 | Brown . |
| 4,897,873 | 1/1990 | Beutler et al. .............. 379/433 |
| 4,899,259 | 2/1990 | Voeten . |
| 4,904,549 | 2/1990 | Goodwin et al. . |
| 4,912,602 | 3/1990 | Zurek et al. . |
| 5,014,346 | 5/1991 | Phillips et al. . |
| 5,028,083 | 7/1991 | Mischneko . |
| 5,109,572 | 5/1992 | Park ............................ 16/341 |
| 5,111,503 | 5/1992 | Takagi . |
| 5,117,073 | 5/1992 | Mischneko . |
| 5,124,889 | 6/1992 | Humbert et al. . |
| 5,148,471 | 9/1992 | Metroka et al. . |

(List continued on next page.)

FOREIGN PATENT DOCUMENTS

| | | |
|---|---|---|
| WO 93/18592 | 9/1993 | European Pat. Off. ......... 455/90 |
| 33 09 832 | 9/1984 | Germany . |
| 5-68156 | 9/1993 | Japan . |
| 5-263563 | 10/1993 | Japan . |
| 2005887 | 8/1990 | United Kingdom . |
| WO 93/18592 | 9/1993 | WIPO . |

OTHER PUBLICATIONS

Owner's Manual for Cordless Electronic Telephone; Realistic Duófone, ET-415; Cat. No. 43-555 (1984).
Owner's Manual for Micro T.A.C. Lite Digital Personal Communicator; Motorola (1992).

*Primary Examiner*—Chi H. Pham
*Assistant Examiner*—Gertrude Arthur
*Attorney, Agent, or Firm*—Schwegman, Lundberg, Woessner & Kluth, P.A.

[57] ABSTRACT

An electronic communication device such as a portable radiotelephone includes a housing and a keypad cover mounted on the housing to rotate about a pivot axis. A hinge connects the keypad cover to the housing and includes a pair of hinge pins extending along the pivot axis between the cover and the housing. The cover includes at least one aperture aligned with the hinge pins, the apertures allowing access to the hinge pins from outside the device to facilitate removal of the keypad cover from the housing. Additionally, the hinge pins include grooved end portions that cooperate with protrusions on the cover to snap the keypad cover toward its open and closed positions.

17 Claims, 4 Drawing Sheets

U.S. PATENT DOCUMENTS

| | | | |
|---|---|---|---|
| 5,178,481 | 1/1993 | Kawamura | 16/341 |
| 5,185,790 | 2/1993 | Mischneko | |
| 5,189,358 | 2/1993 | Tomura et al. | |
| 5,216,711 | 6/1993 | Takagi et al. | |
| 5,235,492 | 8/1993 | Humbert et al. | |
| 5,241,592 | 8/1993 | Carlson et al. | |
| 5,242,767 | 9/1993 | Roback et al. | |
| 5,257,310 | 10/1993 | Takagi et al. | |
| 5,258,892 | 11/1993 | Stanton et al. | |
| 5,274,882 | 1/1994 | Persson | 16/341 |
| 5,276,916 | 1/1994 | Pawlish et al. | |
| 5,278,993 | 1/1994 | Reiff et al. | |
| 5,303,291 | 4/1994 | Takagi et al. | |
| 5,316,168 | 5/1994 | Finch et al. | |
| 5,317,785 | 6/1994 | Kobayashi | |
| 5,327,584 | 7/1994 | Adachi et al. | |
| 5,335,273 | 8/1994 | Takagi et al. | 379/434 |

KEYPAD COVER HINGE

BACKGROUND OF THE INVENTION

1. Field of the Invention

The invention relates to electronic communication devices, and more particularly, to electronic communication devices having a rotatable cover secured to a housing by a hinge assembly.

2. Description of Related Art

Portable electronic communication devices, such as cellular telephones, radio transceivers for trunked radio communication, transceivers having both telephone and dispatch capability, and other such devices, frequently include a main body surrounded by a housing, and a foldable cover pivotally mounted on the housing. In its closed position, the cover protects a keypad of the main body from foreign matter and from unintentional actuation of the keys. Closing the cover also provides greater compactness and thus enables easier storage of the device. In some devices, opening the cover activates the device to allow voice and data transmission. A built-in microphone can be disposed within the cover, or, alternatively, within the main body of the device.

PCT International Publication No. WO 93/18592, which is incorporated herein by reference, discloses one type of radio transceiver, a portable radiotelephone having a foldable cover. The cover includes a hinge arm, which houses two hinge pins that rotate with the cover. A single spring urges the hinge pins into engagement with a housing of the radiotelephone, and the hinge pins include cam surfaces for engaging cam followers affixed to the housing. Rotating the cover between its open and closed positions exerts force upon the cam surfaces of the rotating hinge pins to urge the cover into or out of the open and closed positions.

The radiotelephone of the PCT Publication suffers a significant disadvantage in that the cover of the radiotelephone cannot be removed easily. Removing the cover may be necessary, for example, during overhaul or repair of the radiotelephone, or for storage or shipment of the radiotelephone. To remove the cover, the hinge pins must be disengaged from the housing, that is, each hinge pin must be moved completely into the hinge arm of the cover. The spring of the PCT hinge assembly, however, forces both hinge pins securely into the housing, and very little spacing exists between the housing and the cover. Therefore, moving the hinge pins into the hinge arm to disengage the cover from the housing is very difficult. In fact, the PCT Publication fails to indicate whether removal of the cover is even possible.

The radiotelephone of the PCT Publication also suffers another disadvantage, in that a single spring urges both hinge pins into the housing. Failure of the single spring would reduce or eliminate the force urging both hinge pins into the housing, potentially causing the cover to disengage from the housing and resulting in loss or damage to the cover and any electrical components extending between the cover and the housing. Similarly, failure or removal of one of the hinge pins would compromise the force on the other hinge pin, potentially causing the cover to disengage from the housing.

Finally, the radiotelephone of the PCT Publication concentrates a relatively high amount of weight in the cover. The hinge arm of the cover, which extends across the cover in its entirety, adds substantial weight. Additionally, the hinge pins are secured to and rotate with the cover, further increasing the load on the cover. Increased cover load undesirably increases the wear on the hinge pins and on those portions of the housing that receive the hinge pins.

SUMMARY OF THE INVENTION

To overcome the above and other disadvantages, an electronic communication device according to an embodiment of the invention includes a housing, a cover mounted on the housing to rotate about a pivot axis, and at least one hinge pin extending along the pivot axis between the cover and the housing. The at least one hinge pin supports the cover for rotational movement about the pivot axis. Further, one of the housing and the cover including an aperture extending therethrough, the aperture having an inner opening that is smaller than a diameter of the at least one hinge pin and that is coaxial with the at least one hinge pin, the aperture allowing access to the at least one hinge pin from outside the electronic communication device to facilitate removal of the cover from the housing.

According to another aspect of the invention, an electronic communication device includes a housing, a cover mounted on the housing to rotate about a pivot axis between an open position and a closed position, and at least one hinge pin extending along the pivot axis between the cover and the housing and supporting the cover for rotational movement about the pivot axis. The at least one hinge pin includes a recessed portion, a portion of the cover moving along the recessed portion as the cover rotates to urge the cover toward the open position and toward the closed position. The at least one hinge pin remains stationary as the cover rotates.

According to another aspect of the invention, a portable radiotelephone includes a housing and a cover mounted on the housing to rotate about a pivot axis between an open position and a closed position. The radiotelephone further includes hinge means for supporting the cover for rotational movement on the housing, the hinge means comprising recess means for urging the cover toward the open position and toward the closed position. The cover includes aperture means coaxial with the pivot axis and extending through the cover for allowing access to the at least one hinge pin from outside the radiotelephone to facilitate removal of the cover from the housing.

According to another aspect of the invention, a method of removing a cover from a housing of an electronic communication device includes inserting a removal element through an aperture in at least one of the cover and the housing, and sliding the at least one hinge pin of the device along the pivot axis with the removal element to release the cover from the housing.

BRIEF DESCRIPTION OF THE DRAWINGS

Embodiments of the invention will be described with reference to the Figures, in which like reference numerals denote like elements and in which.

DETAILED DESCRIPTION OF PREFERRED EMBODIMENTS

FIGS. 1-5 of the application illustrate a keypad cover hinge of a radiotelephone according to the invention. The invention, however, is not limited to hinges for keypad covers, and further is not limited to hinges used in radiotelephones. On the contrary, embodiments of the invention have application to a wide variety of portable electronic devices and other devices, not just radiotelephones. Additionally, embodiments of the invention have application to other hinges on such devices. Therefore, while preferred embodiments of the invention will be described with respect to keypad cover hinges for portable radiotelephones, the invention is not limited to such devices.

Figure 1:
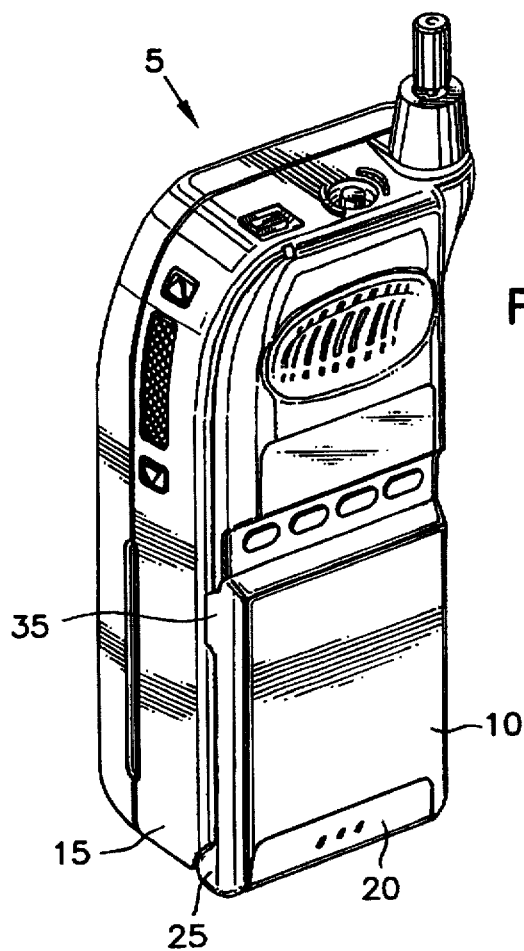
FIG. 1 is a perspective view of a portable radiotelephone according to an embodiment of the invention.
Figure 2:
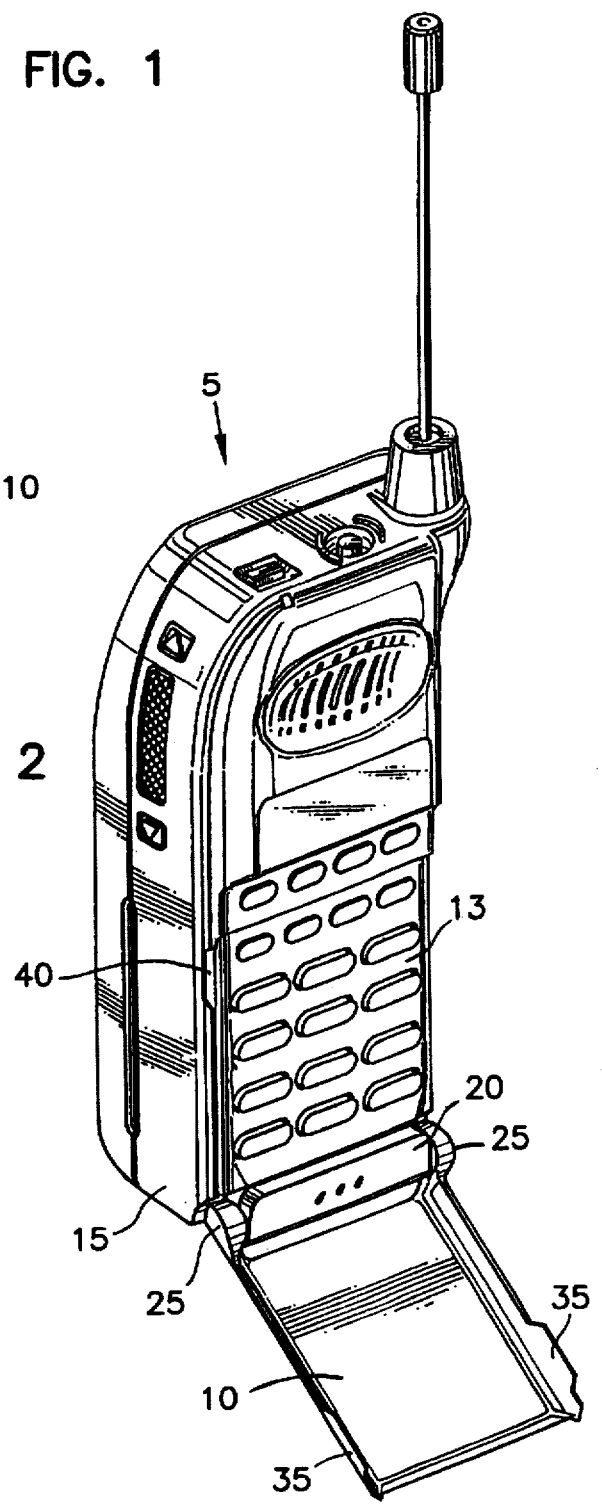
FIG. 2 is a perspective view of the FIG. 1 radiotelephone, showing alternative positions for an extendable antenna and a keypad cover.
Figure 3:
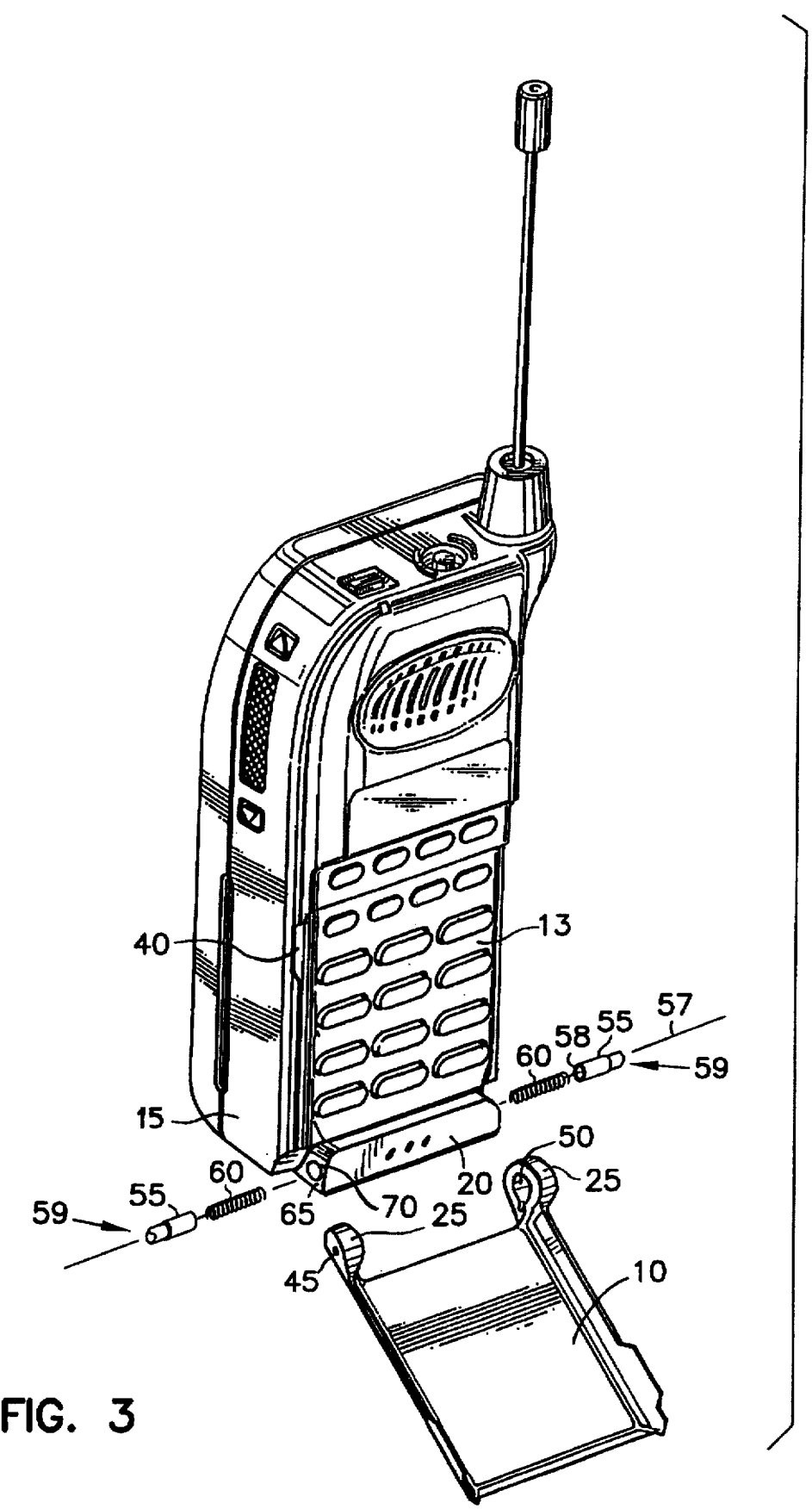
FIG. 3 is an exploded perspective view of the FIG. 1 radiotelephone.

FIGS. 1-3 show an electronic communication device, specifically a radiotelephone, according to the invention. Device 5 includes housing 15, which supports keypad 13 in a preferably fixed orientation and which rotatably supports keypad cover 10. Keypad cover 10 rotates about pivot axis 57 (FIG. 3) between the closed position of FIG. 1, in which cover tabs 35 are engaged with housing recesses 40, and the open position of FIG. 2. The transmission capabilities of device 5 can be activated or modified by rotating keypad cover 10 into the open position, or, alternatively, the transmission capabilities of device 5 can be unrelated to rotation of keypad cover 10 and instead activated by an external switch or the like.

Housing 15 includes a centrally located hinge extension 20, which preferably is disposed below keypad 13 and which is used to rotatably support keypad cover 10 in a manner to be described. Keypad cover 10 also can assume other positions and orientations according to alternative embodiments of the invention, for example at the side of keypad 13 instead of below it.

Keypad cover 10 includes two hinge-pin-accommodating portions 25, disposed in alignment with and on opposite sides of hinge extension 20, and toward the outside of device 5 with respect to hinge extension 20. Portions 25 include hinge pin sockets 50 (FIGS. 3-5), which receive respective hinge pins 55 to secure cover 10 with respect to housing 15. Each hinge pin 55 is slidable along pivot axis 57 between a cover-securing position, in which hinge pins 55 extend between hinge extension 20 and keypad cover 10 to secure cover 10, and a cover-releasing position, in which hinge pins 55 are within sockets 65 of hinge extension 20 and are withdrawn from sockets 50.

Biasing elements 60, preferably in the form of coil springs, bias pins 55 toward their cover-securing positions. Springs 60 are coupled with pins 55, either by non-affixed frictional abutting contact or by a more permanent type of fastening means. Springs 60 preferably do not contact each other within hinge extension 20, but instead are separated by a central solid portion between the opposite sockets 65 of hinge extension 20. Thus, springs 60 are compressed between hinge pins 55 and wall portions such as wall portion 67 defining the bases of sockets 65.

Using two springs 60 instead of a single spring provides significant advantages over the prior art. If only one spring were disposed within hinge extension 20, failure of that spring would compromise the force urging both hinge pins 55 into hinge extension 20, potentially causing cover 10 to disengage from housing 15 and resulting in loss or damage to cover 10 and any electrical components extending between cover 10 and housing 15. On the other hand, the two springs 60 according to the invention provide redundancy, such that cover 10 is more likely to remain on housing 15 if one of springs 60 fails. Similarly, if device 5 included only a single spring, removal or failure of one of hinge pins 55 would compromise the force on the other of hinge pins 55.

Figure 4:
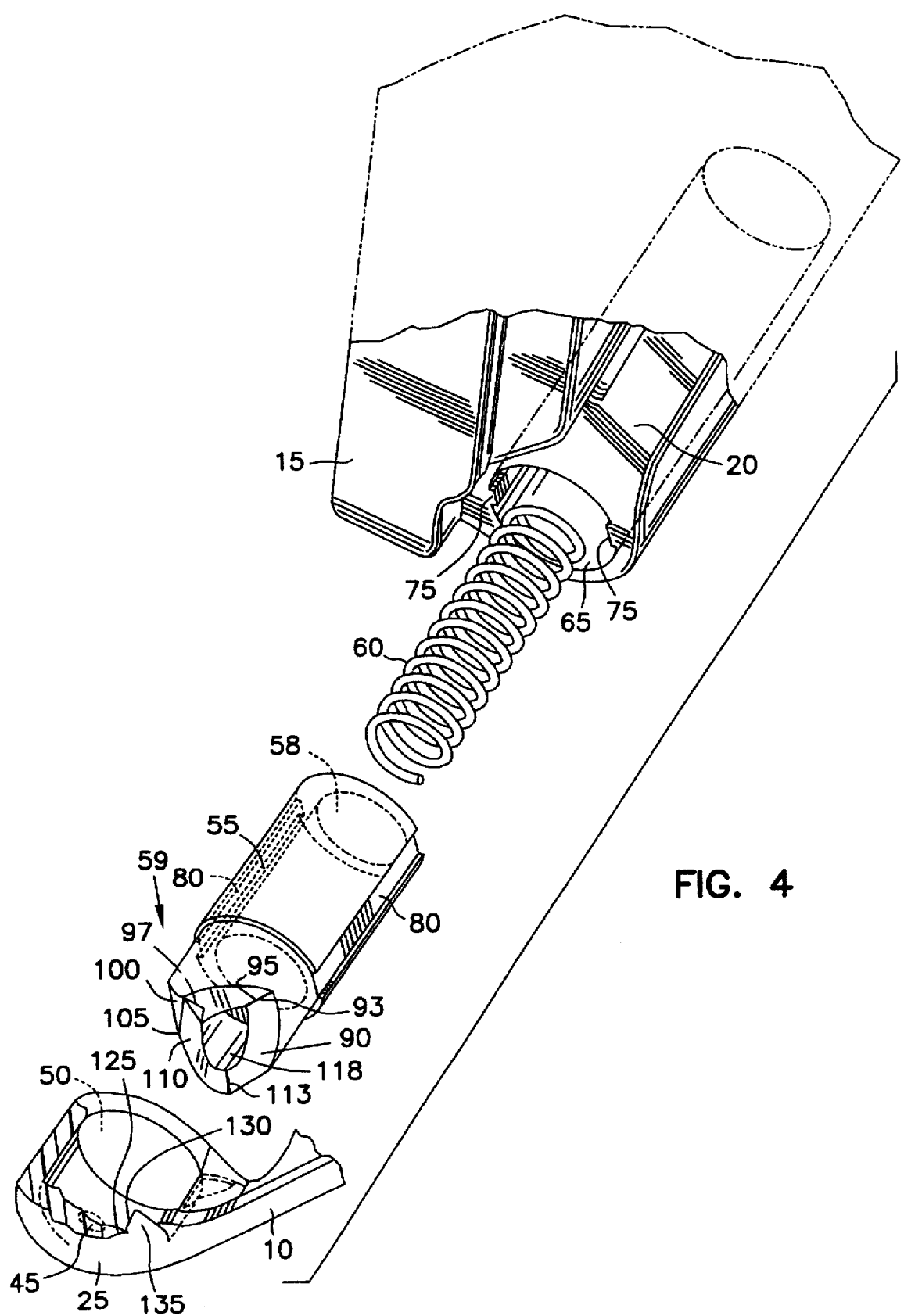
FIG. 4 is a detailed exploded view of a hinge assembly of the FIG. 1 radiotelephone.

As shown in FIG. 3, sockets 65 of hinge extension 20 each include posts 70 (may be shown in FIG. 4 in phantom), for receiving central cavity 58 of hinge pins 55 10. (FIG. 4) as well as the central opening of springs 60. Additionally, pins 55 include longitudinally extending channels 80 for receiving projections 75 of hinge extension 20. Although two channels 80 are illustrated in FIG. 4, disposed on opposite sides of each hinge pin 55, a single channel or more than two channels can also be used. The interlocking relationship between projections 75 and channels 80 prevents pins 55 from rotating within hinge extension 20. Thus, hinge pins 55 remain stationary as cover 10 rotates with respect to housing 15.

Hinge pins 55 include grooved/recessed end portions 59, which cooperate with protrusions 120 of cover 10 to urge cover 10 toward its closed position (FIG. 1), preferably when cover 10 is nearer its closed position than its open position along its path of rotation. Similarly, cooperation between end portions 59 and protrusion 120 urges cover 10 toward its open position when cover 10 is nearer is open position than its closed position along its path of rotation. End portions 59 thus act as cams, and protrusions 120 as cam followers, to snap cover 10 to the open position when, for example, device 5 is to be used, and to the closed position when, for example, use of device 5 is completed.

Grooved end portions 59 of hinge pins 55 each include two high portions 97, 113 and two low portions 93, 105. Ramped portions 90, 95, 100 and 110 extend between high portion 113 and low portion 93, low portion 93 and high portion 97, high portion 97 and low portion 105, and low portion 105 and high portion 113, respectively. Although the illustrated grooved end portions 59 are designed to begin urging cover 10 toward either the open or closed position at approximately the halfway point along the swing of cover 10 between its open and closed positions, end portions 59 can also be designed to begin urging cover 10 toward the open or closed position at different points along its path of rotation.

Figure 5:
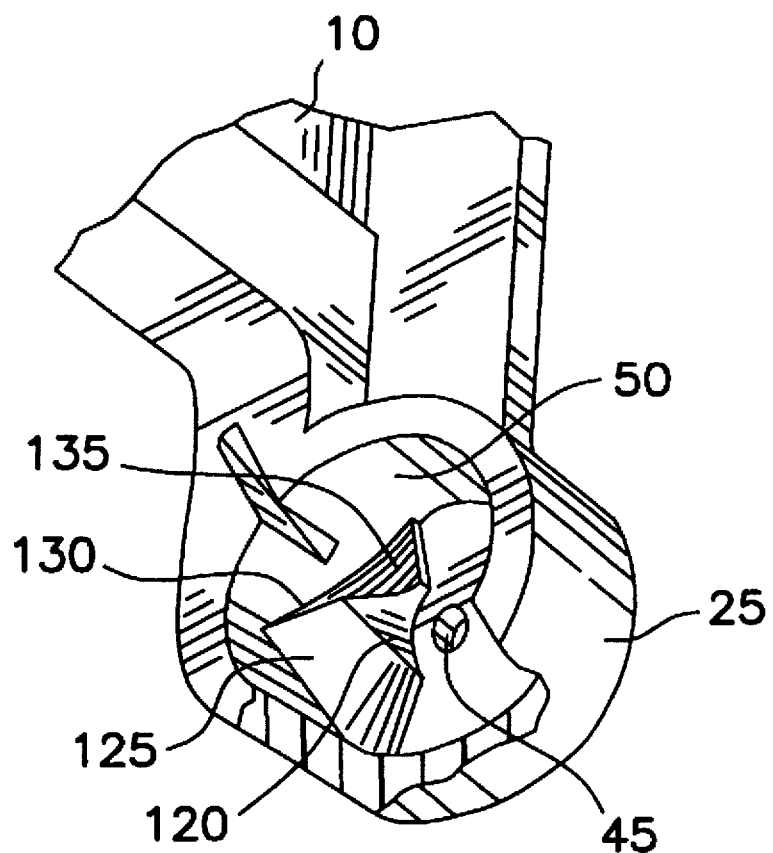
FIG. 5 is a detailed perspective view of a portion of the keypad cover of the FIG. 1 radiotelephone, according to an embodiment of the invention.

As best shown in FIG. 5, protrusions 120 are disposed within sockets 50 of hinge-pin-accommodating portions 25, and each protrusion includes ramped surfaces 125, 135 meeting at tip 130. In the closed position of cover 10, tip 130 is positioned at low portion 93 of hinge pin end portion 59. As cover 10 rotates on hinge extension 20 towards its open position, tip 130 travels along ramped surface 90 toward high portion 113, which according to the illustrated embodiment corresponds approximately to the half-opened/half-closed position of cover 10. If cover 10 is released before reaching the halfway point, tip 130 slides back toward low portion 93 and thus cover 10 snaps to its closed position once again. Once tip 130 passes high portion 113 and encounters ramped portion 110, however, release of cover 10 causes tip 130 to move toward low portion 105, and cover 10 thus snaps to its open position instead of its closed position.

According to the illustrated embodiment, each hinge pin end portion 59 is formed symmetrically about a line extending between high portions 97, 113, that is, the shape and disposition of ramped portions 90, 95 and low portion 93 are identical to those of ramped portions 100, 110 and low portion 105. Consequently, each hinge pin 55 can be inserted into socket 65 of hinge extension 20 without regard to its orientation, after ensuring that channels 80 are aligned with projections 75. In this embodiment, high portion 113 is formed as a plateau instead of as a point, to provide an area where tip 130 could remain without sliding toward low portions 93 or 100. Thus, cover 10 can remain in a half-opened/half-closed position. Alternatively high portions 97, 113 can both be point surfaces, in which case no half-opened, half-closed position would be created.

Device 5 also includes apertures 45, each disposed within hinge-pin-accommodating portions 25 along pivot axis 57. The inner opening of each aperture 45, best seen in FIG. 5, is smaller than a diameter of hinge pin 55, to prevent hinge pin 55 from sliding through the aperture. Apertures 45 allow insertion of a cover removal element, such as a pin or other long object of small diameter, through cover 10. In the illustrated embodiment, the cover removal element engages a cylindrical cavity 118 within the center of end portion 59 of hinge pin 55 and moves hinge pin 55 against the biasing action of spring 60, until hinge pin 55 is completely withdrawn from socket 50 of cover 10. Once hinge pin 55 is removed from cover 10 and substantially within hinge pin socket 65 of hinge extension 20, cover 10 can be easily removed from housing 15. Apertures 45 thus facilitate removal of cover 10 from housing 15 and represent a significant advantage over prior art devices, in which removal of the keypad covers was quite difficult, if not impossible.

According to the illustrated embodiment, apertures 45 are within hinge-accommodating-portions 25 of cover 10. According to an alternative embodiment, however, hinge extension 20 can be formed in two portions to surround a single hinge-accommodating-portion of keypad cover 10. Note, for example, previously described International Publication No. 93/18592. In the alternative embodiment, apertures 45 are disposed in each of the two hinge extensions along the pivot axis, that is, in the housing of the device, to facilitate removal of the cover from the housing.

As described above, a hinge according to the invention represents a number of advantages over the prior art. Keypad cover removal can be accomplished quickly and easily, merely by inserting a cover removal element through apertures 45 to remove hinge pins 55 from the cover. Providing two springs instead of a single spring creates redundancy and lessens the likelihood of accidental disengagement of the cover from the device. Finally, high weight concentrations in the cover are avoided, decreasing wear on the hinge pins and on those portions of the housing that receive the hinge pins.

While the invention has been described with reference to specific embodiments, the description is illustrative and is not to be construed as limiting the scope of the invention. Various modifications and changes may occur to those skilled in the art without departing from the spirit and scope of the invention.

I claim:

1. An electronic communication device, comprising:
a housing;
a cover mounted on the housing to rotate about a pivot axis; and
a hinge pin extending along the pivot axis between the cover and the housing, the hinge pin supporting the cover for rotational movement about the pivot axis between an open position and a closed position, the hinge pin being adapted to slide along the pivot axis between a cover-releasing position and a cover-securing position;

one of the housing and the cover including an aperture extending therethrough and opening to the exterior of the device, the hinge pin having an end portion that is located adjacent to the aperture when the hinge pin is in its cover-securing position, the aperture being coaxial with the hinge pin, and the diameter of the aperture being smaller than the outer diameter of said end portion of the hinge pin to prevent the hinge pin from sliding through the aperture, the aperture allowing access to the hinge pin from the exterior of the electronic communication device for sliding the hinge pin to the cover-releasing position to facilitate removal of the cover from the housing.

2. The device of claim 1, further comprising biasing means for biasing the hinge pin toward the cover-securing position, and wherein the aperture is constructed to receive a cover removal element inserted therethrough to engage the hinge pin and to slide the hinge pin against the force of the biasing means along the pivot axis from the cover-securing position toward the cover-releasing position.

3. The device of claim 1, wherein the housing includes a hinge extension, a portion of the hinge pin being disposed within the hinge extension, and wherein the cover includes a hinge-pin-accommodating portion aligned with the hinge extension and disposed toward the outside of the electronic communication device relative to the hinge extension, the aperture extending through the hinge-pin-accommodating portion of the cover.

4. The device of claim 3, wherein the hinge pin is disposed entirely within the hinge extension when the hinge pin is in the cover-releasing position, and the hinge pin extends between the hinge extension and the hinge-pin-accommodating portion to secure the cover to the housing when the hinge pin is in the cover-securing position.

5. The device of claim 1, including a second hinge pin, the two hinge pins being disposed along the pivot axis, each of the two hinge pins being movable between a cover-securing position and a cover-releasing position, the device further comprising first and second biasing elements coupled with respective ones of the two hinge pins to bias the respective hinge pin toward its cover-securing position.

6. The device of claim 5, wherein the housing includes a hinge extension, the hinge pins being disposed within the hinge extension, further wherein the cover includes hinge-pin-accommodating portions disposed on opposite sides of the hinge extension.

7. The device of claim 6, wherein the aperture extends through one of the hinge-pin-accommodating portions of the cover, and including a further aperture extending through the other of the hinge-pin-accommodating portions of the cover.

8. The device of claim 6, wherein the hinge extension of the housing comprises two hinge pin sockets that receive the respective two hinge pins.

9. The device of claim 1, wherein the hinge pin is stationary as the cover rotates with respect to the housing.

10. The device of claim 9, wherein the end portion of the hinge pin comprises a grooved portion, and the cover comprises a protrusion that moves along the grooved end portion of the hinge pin as the cover rotates to urge the cover toward the open position and toward the closed position.

11. An electronic communication device, comprising:
a housing;
a cover mounted on the housing to rotate about a pivot axis between an open position and a closed position;
first and second hinge pins, each hinge pin extending along the pivot axis between the cover and the housing and supporting the cover for rotational movement about the pivot axis; and, first and second biasing elements disposed between the first and second hinge pins, the first biasing element biasing only the first hinge pin toward a cover-securing position, and the second biasing element biasing only the second hinge pin toward a cover-securing position;

at least one of the hinge pins including a recessed end portion, a portion of the cover moving along the recessed end portion as the cover rotates to urge the cover toward the open position and toward the closed position, the first and second hinge pins remaining stationary as the cover rotates.

12. The device of claim 11, wherein the housing comprises a hinge extension, the first and second hinge pins being disposed within the hinge extension, and wherein the cover comprises first and second hinge-pin-accommodating portions aligned with the hinge extension and disposed on opposite sides of the hinge extension.

13. The device of claim 12, wherein each of the hinge-pin-accommodating portions of the cover includes an aperture extending therethrough coaxial with the pivot axis, allowing access to the hinge pins from outside the electronic communication device to facilitate removal of the cover from the housing.

14. The device of claim 11, wherein the portion of the cover comprises two ramped surfaces meeting to form a tip that engages and slides along the recessed end portion of the at least one hinge pin.

15. The device of claim 11, wherein the device is a portable radiotelephone.

16. A portable radiotelephone, comprising:

a housing;

a cover mounted on the housing to rotate about a pivot axis between an open position and a closed position; and a hinge pin extending along the pivot axis for supporting the cover for rotational movement on the housing, the hinge pin including an end portion cooperating with said cover for urging the cover toward the open position and toward the closed position, the hinge pin being adapted to slide along the pivot axis between a cover-releasing position and a cover-securing position;

the cover including an aperture coaxial with the pivot axis and extending through the cover, the diameter of the aperture being smaller than the outer diameter of said end portion of the hinge pin to prevent the hinge pin from sliding through the aperture, the aperture opening to the exterior of the radiotelephone to be accessible from the exterior of the radiotelephone when the cover is in either one of said positions, for allowing access to the hinge pin through the aperture from outside the radiotelephone for sliding the hinge pin to the cover-releasing position to facilitate removal of the cover from the housing.

17. A method of removing a cover from a housing of an electronic communication device, the cover being rotatable on the housing about a pivot axis between an open position and a closed position and being supported on the housing by at least one hinge pin, the hinge pin being adapted to slide along the pivot axis between a cover-securing position in which an end portion of the hinge pin extends into the cover, and a cover-securing position for moving said end portion out of the cover, the method comprising:

inserting a removal element through an aperture in the cover and into engagement with said end portion of the hinge pin which is located within the cover when the hinge pin is in its cover-securing position, wherein the aperture is coaxial with the pivot axis and opens to the exterior of the electronic communication device to be accessible from the exterior of device when the cover is in either one of said open and closed positions; and sliding the hinge pin of the device along the pivot axis to move said end portion out of the cover with the removal element to release the cover from the housing.

* * * * *